Inventor
Eric Olle Schjolin

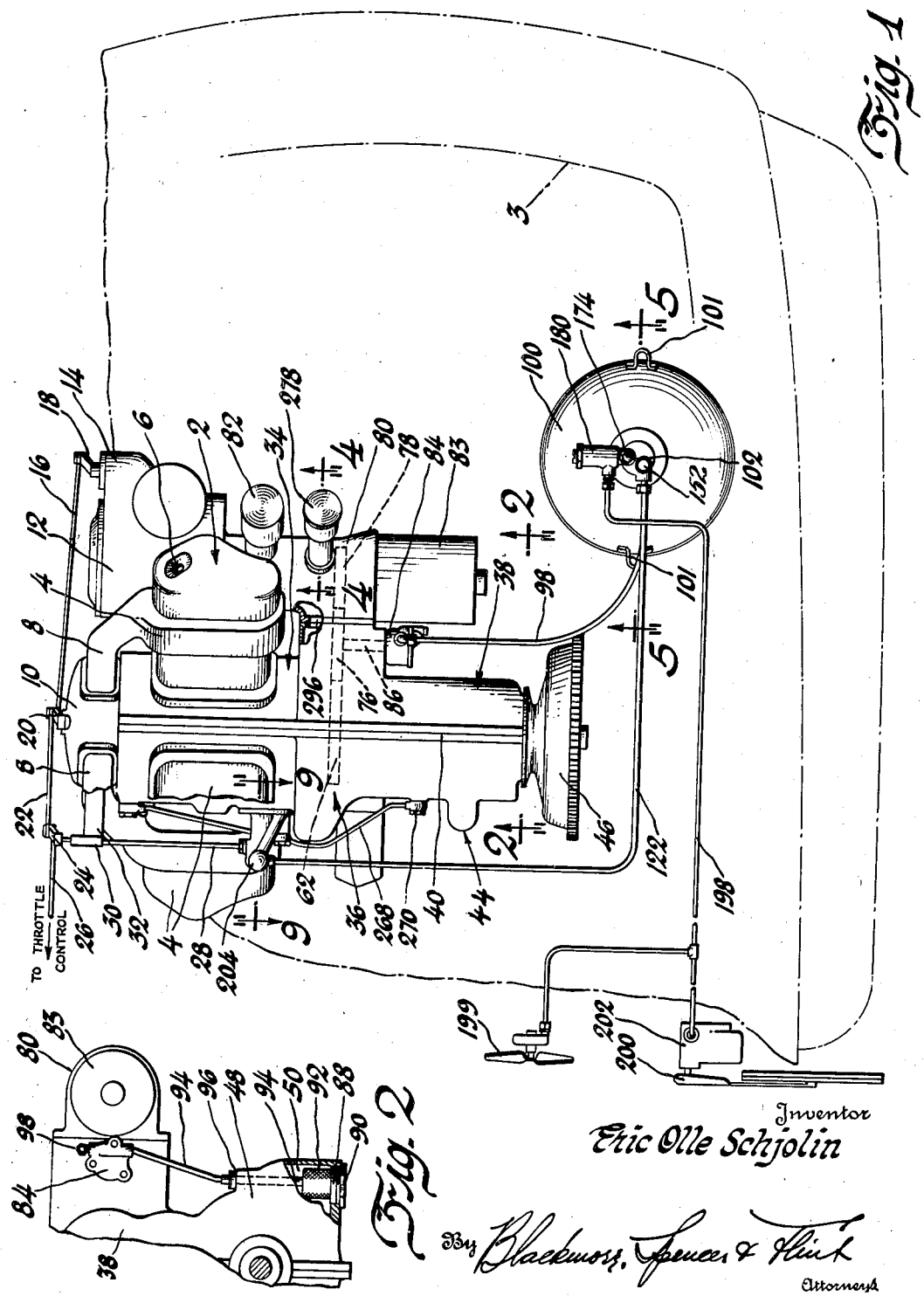

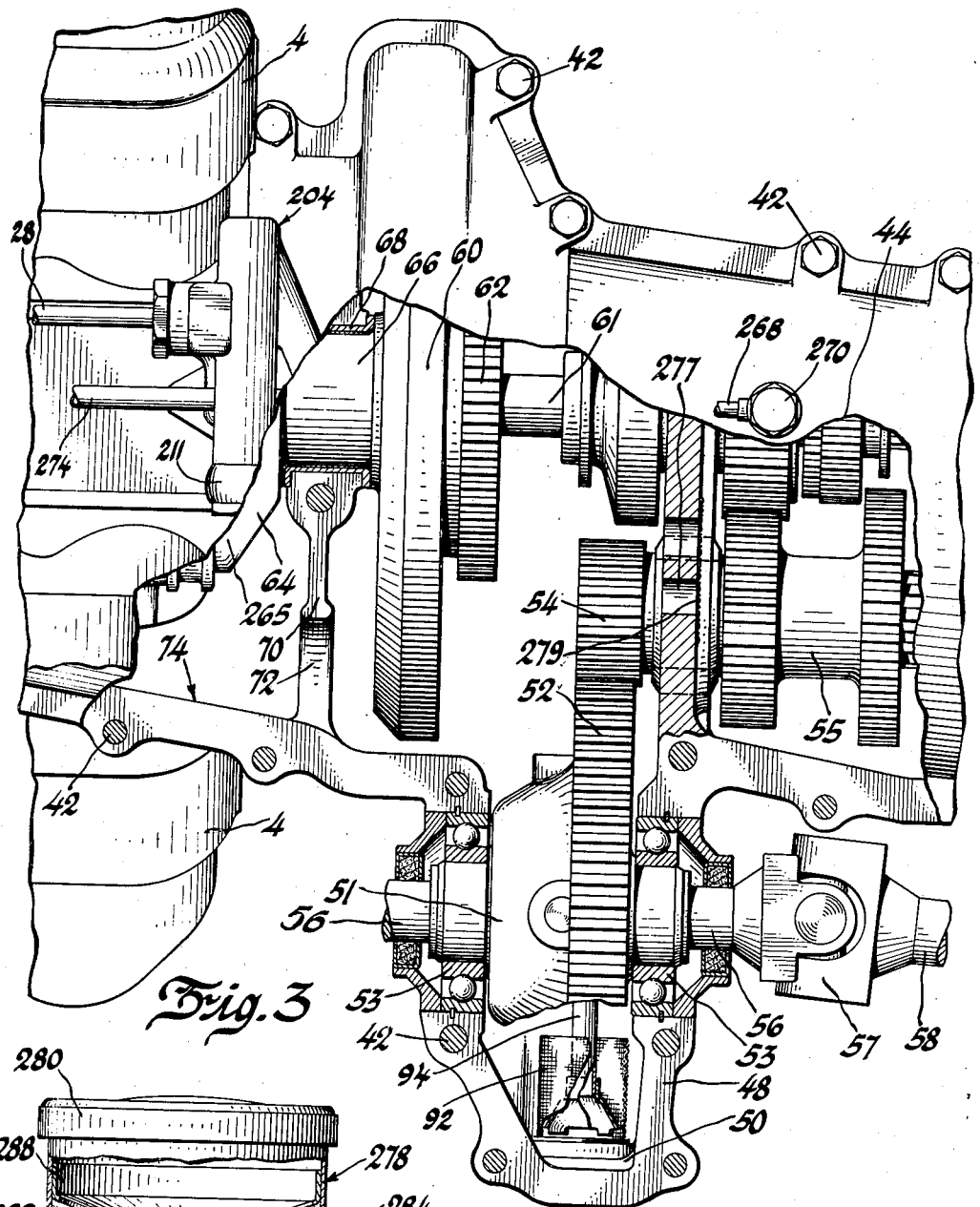
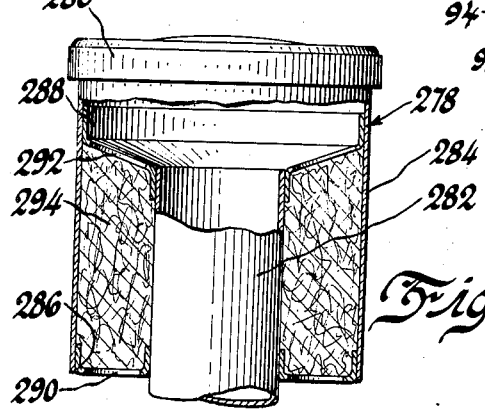

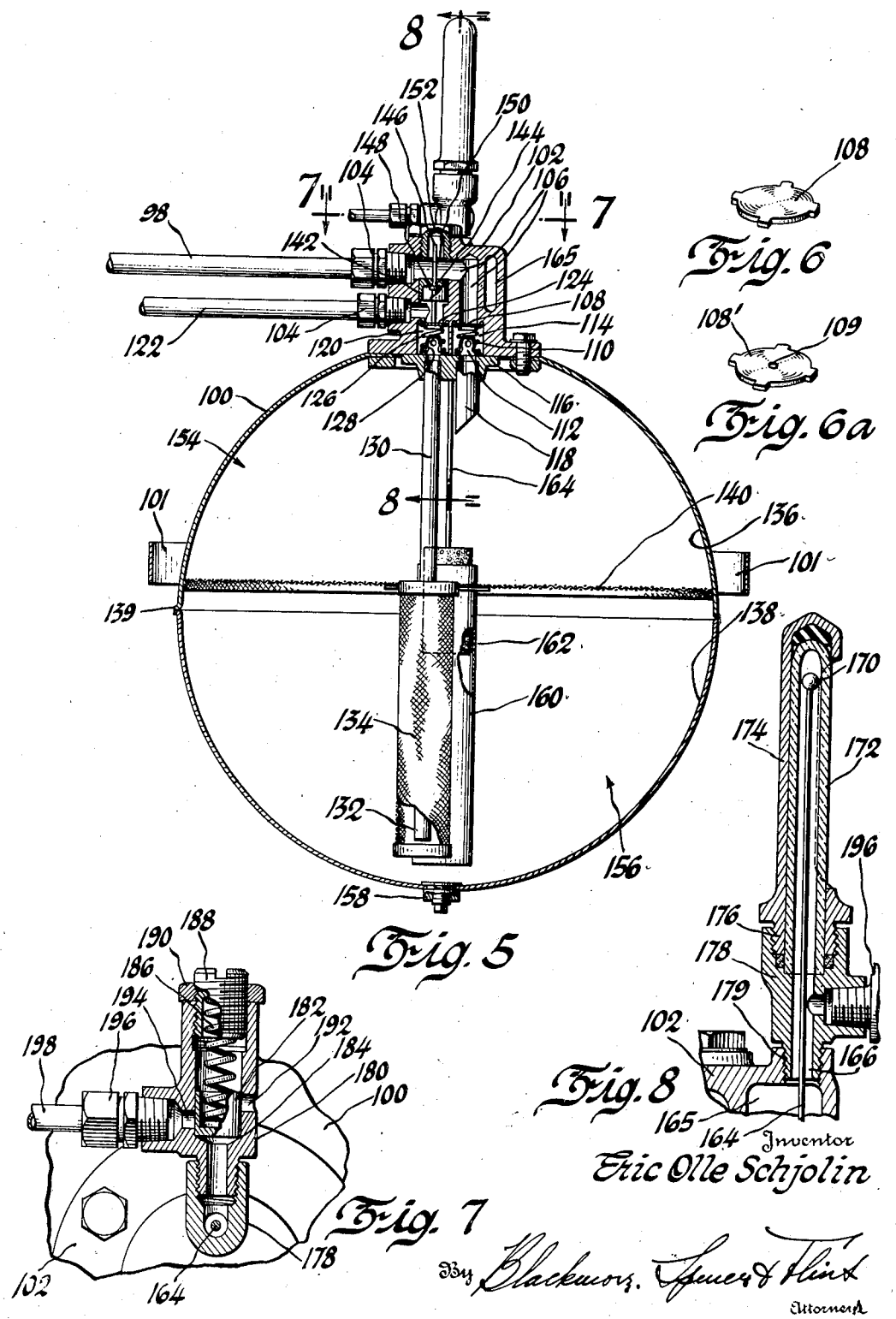

Patented Dec. 12, 1939

2,182,948

UNITED STATES PATENT OFFICE

2,182,948

OILING SYSTEM

Eric Olle Schjolin, Pontiac, Mich., assignor to General Motors Corporation, Detroit, Mich., a corporation of Delaware Application February 24, 1936, Serial No. 65,220

5 Claims. (Cl. 184—6)

This invention relates to the lubricating or oiling systems and has particular reference to a system used to lubricate the bearing parts of an internal combustion engine, transmission and differential of an automotive vehicle.

The invention is applied to an engine installed at the rear of a vehicle, the body of which is disclosed in my copending application Ser. No. 41,062, filed September 18, 1935. In installing the engine at the rear of the vehicle it is possible closely to interrelate the engine, transmission, and differential so that the same lubricant may be used to oil the bearing or moving parts of all three.

According to the invention, the lubricant to oil the bearing parts drains to a sump in the differential housing. A pipe leads from this sump to an oil pump driven by the engine, the pump taking the oil and air from the sump and forcing it into a fluid tight receptacle or container. The container has an inlet and an outlet both of which have one-way valves opening in the same direction so that oil and air may readily pass into the receptacle but are prevented from leaving it. A piston, operated and controlled by the pressure of the oil as it enters the container, operates the valve in the outlet so that the outlet valve is open when oil and air are being forced into the container. The air pressure in the container will force the lubricant through the outlet into a pipe or conduit which leads to a flow control. The flow control has a spring, the compression of which is controlled by a lever operated in timed relation with the throttle valve so that the more the throttle is opened the less will be the compression of the spring. This will allow an increased amount of oil to be delivered to the bearing parts when the throttle is open, or oil will be delivered in greater quantities the faster the vehicle is being driven. Suitable branch conduits from the flow control each take a portion of the oil and deliver it to the engine and to the transmission to lubricate the bearings and gears.

In the oiling system of the invention the pump itself does not force the lubricant to the bearing parts. The pump merely delivers the oil and air to the receptacle. In pumping oil to the receptacle the pump carries along with it a considerable quantity of air for the reason that the pump operates fast enough to be able to withdraw the oil from the sump faster than the oil accumulates so that the pump will keep the sump substantially dry or free of oil. In passing the oil and air to the receptacle a considerable amount of superatmospheric pressure will be created and maintained. The amount of pressure to be maintained is regulatable by a safety or exhaust valve controlled by a spring. In actual practice it is preferred to keep about a forty-pound air pressure in the tank and it is this air pressure which forces the lubricant from the outlet to the parts to be lubricated.

The receptacle is usually only about half full of oil so that the upper part contains air under pressure. A suitable outlet from the air containing part of the lubricant container is led to any suitable auxiliary device or devices such as the windshield wiper, an air spring, a fuel pump, a vacuum fan, etc., the air pressure being more than sufficient to operate any or all of these auxiliaries.

On the drawings

Figure 1 is a plan view of a combined engine, transmission, and differential construction showing the lubricating system applied, parts being broken away and shown in section better to illustrate the construction.

Figure 2 is a detailed side view of the differential and oil pump with parts broken away showing the oil sump.

Figure 3 is an enlarged detailed view with parts broken away to show the interior of the transmission and crankcase adjacent the differential and the sump.

Figure 4 is a sectional detailed view on the line 4—4 of Figure 1 through the oil filler and air inlet to the transmission housing and sump.

Figure 5 is a sectional detailed view on the line 5—5 of Figure 1 through the oil receptacle and the fixture at the top thereof.

Figure 6 is a detailed perspective view of one of the flat valves in the inlet and outlet ports of the fixture in Figure 5.

Figure 6a is a view similar to Figure 6 of a modified form of valve.

Figure 7 is a sectional detailed view of the pressure relief valve and the connection to the auxiliary devices, taken on the line 7—7 of Figure 5.

Figure 8 is a sectional detailed view through the level gage taken on the line 8—8 of Figure 5.

Figure 9:
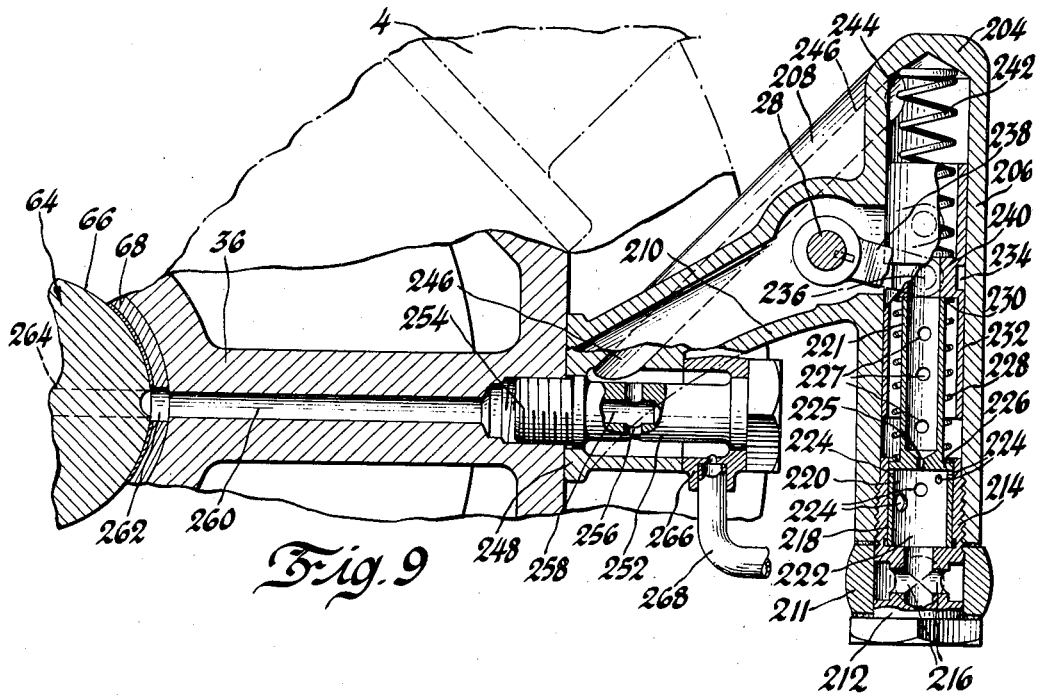
Figure 9 is a sectional detailed view through the flow control taken substantially on the line 9—9 of Figure 1.

Referring to the drawings, the numeral 2 indicates an internal combustion engine as a whole which is mounted at the rear of a vehicle indicated in dotted outline at 3. In the present instance the engine is a two-cycle engine with four radial U-type cylinders 4. Each cylinder has a spark plug opening indicated at 6. The usual induction system is indicated at 8, the induction system being provided with a rotary ring throttle valve in the housing 10. The engine is provided with a blower the housing of which is indicated at 12 and with a blower bypass valve the housing of which is indicated at 14. A rod 16 connected to a lever 18 operates the bypass valve, the rod 16 in turn being connected to the lever 20 connected to the throttle in the housing 10. A rod 22 connected to the lever 20 is in turn connected to a second lever 24 which in turn is operated from a rod 26 controlled from the driver's seat. The lever 24 is secured to a shaft 28 operating in a bearing 30 secured to an arm 32 mounted on the engine.

The engine block 34 comprises the two halves 36 and 38 which meet along the line 40 and are secured together by suitable bolts 42 (Figure 3) to form an oil tight connection. The engine block includes the housing for the transmission indicated as a whole at 44 and which is disclosed more in detail in my copending application Serial No. 55,626, filed December 21, 1935. The clutch is indicated at 46 which is likewise disclosed in detail in my application Serial No. 55,626.

The lower part of the transmission housing and engine block has the extension 48 which forms a sump 50 at the bottom thereof. In the extension 48 the differential 51 is located. The differential has the ring gear 52 and is mounted in the roller bearings 53 at each side. The ring gear 52 meshes with a gear 54 secured to the end of the shaft 55 of the transmission. From the differential there extend the live shafts 56 each of which has secured thereto the universal joints 57 which in turn have the shafts 58 which extend to universal joints (not shown) at the rear wheels of the vehicle to drive the same. Only one universal joint 57 is shown but the universal joints are on the drive shafts at both sides. The wheels of the vehicle of the invention are independently sprung as is better disclosed in my Patent No. 2,076,046, issued April 6, 1937.

The flywheel is indicated at 60 and the transmission shaft at 61. The flywheel has a gear 62 rigid therewith which is used to drive the accessories of the vehicle. The crankshaft is indicated at 64 and has the bearing part 66 mounted in the bearing shells 68 positioned in the ribs 70 of the crankcase. The inner rib 70 has the opening 72 therein to allow the oil to flow from the bottom 74 of the crankcase into the sump 50.

The gear 62 meshes with an idler 76 (Figure 1) which in turn meshes with the gear 78 which drives a shaft in the housing 80 secured to the side of the engine block. The shaft in the housing 80 drives the auxiliary mechanisms such as the distributor 82, the generator 83, the blower in the housing 12, etc. The oil pump 84 is driven from a shaft 86 on which the idler gear 76 is mounted.

The sump 50 (Figure 2) has a drain opening 88 in its bottom in which there is threaded the plug 90 having the screen 92 secured thereto. A pipe 94 extends into the screen 92 and passes up through a shoulder 96 in the sump and is connected to the oil pump 84 at its upper end. The oil pump 84 may be of any conventional type.

From the oil pump 84 a conduit 98 leads to a fluid tight oil reservoir or receptacle 100 shown in detail in Figure 5. The receptacle 100 may be of any suitable size and any desired shape but preferably it has a diameter of about ten inches and is ball shaped for the reason that the ball shaped container affords the greatest capacity for the least space occupied. The receptacle is provided with two handles or brackets 101 rigid therewith to enable it to be easily handled and to aid in mounting it in place.

The pipe 98 delivers into a fixture 102 at the top of the container and is connected to the fixture by means of fittings 104. The numeral 106 indicates the inlet through the fitting to the container, this inlet being in the form of an L-shaped passage. Where the inlet delivers to the container, a spring 110 holds a flat valve 108 (Figure 6) on its seat in the mouth of the inlet 106. The valve 108 is a one-way valve and will enable oil to enter the container 100 but will prevent the exit therefrom. A suitable conical support 112 provided with oil holes is surrounded by the spring and is held in the mouth 114 of the inlet by means of the closure member 116 secured to the bottom of the fixture 102 in any suitable way. A short pipe 118 is secured to the closure member 116 and extends into the container from the mouth 114.

It sometimes happens that it is difficult to prime the pump after the engine has been idle for a considerable period. This difficulty occurs where the pump is positioned higher than the sump as shown in Figure 2. This priming difficulty is caused by the draining of the oil from the pipes 94 and 98 and from the pump into the sump, leaving the pump and pipes 94 and 98 filled with air. When starting the pump the pressure to be built up by the pump must be sufficient to open the inlet valve 108 against the back air pressure in the container 100. Inasmuch as the pump 84 is not a very good air pump it overcomes the back pressure in the container with difficulty only. To relieve this condition there is used a valve 108' (Figure 6a) which is provided with a small bleed opening 109 so that when the engine stops the air in the tank will bleed back through the opening 109, the pipe 98, pump 84 and pipe 94 into the sump to relieve the pressure in the tank. With this pressure relieved, the pump will be able to prime itself without difficulty and quickly rebuild the superatmospheric pressure in the tank 100. Where the pump 84 is positioned in the sump, the problem of the difficulty in priming does not arise and a valve without an opening such as shown in Figure 6, may be used.

The fixture 102 has the outlet 120 in the form of an L-shaped passage and to which there is connected the outlet pipe or conduit 122 held to the fixture 102 by means of fittings similar to the fittings 104. The outlet 120 also has therein a valve 124 similar to the valve 108, the valve 124 being held against its seat in the mouth of the outlet by means of a spring 126 similar to the spring 110. A cone support 128 similar to the cone support 112 is provided in the outlet passage and is surrounded by the spring 126. The cone 128 is held in the outlet passage by the closure member 116. The function of both cone supports 112 and 128 is to position the springs and hold them in place and to prevent the valves 108 and 124 from being forced too far away from their seats.

To the member 116 there is connected the outflow pipe 130 which extends far down into the receptacle and ends at 132 a short distance from the bottom and at its top delivers into the mouth of the outlet 116. A gauze cylinder 134, closed at its top and bottom and serving as a screen, surrounds the pipe 132 and extends upward to a short distance beyond the middle of the receptacle 100. The receptacle 100 is formed in two hemispherical halves 136 and 138 secured together in any suitable way at 139 and inside the upper hemispherical half 136 there is secured the circular screen 140 through which the oil must pass after it is delivered to the receptacle. The screen 134 is secured to the screen 140. If desired, the screen 134 may be secured directly to the pipe 130.

Between the inlet 106 and the outlet 120 in the fixture 102 a passage 142 is provided. In this passage there is positioned the piston 144 the top of which is subject to the pressure of the air and oil entering the inlet 106. A rod or stem 146 passes through an opening in the piston and a washer or ring 148 formed on or secured to the rod 146 abuts against the inside of the piston 144. If desired the rod 146 or the washer 148 may be secured to the piston. The upper portion of the rod 146 passes through an opening in a guide disc 150 mounted in a cap 152 screw-threaded into an opening in the fixture 102 in alignment with the passage 142. The rod 146 extends downward until it contacts with the valve 124 when the parts are in the position shown in Figure 5. When the pump 84 is operating and delivering oil and air into the inlet 106, pressure will be exerted on the upper side of the piston 144 to force the piston downward. This downward movement will cause the end of the rod 146 to push the valve 124 from its seat against the tension of the spring 126 to cause the opening of the outlet 120 to allow the pressure of the air in the air chamber 154 to force the oil through the screen 134 and into the outlet pipe 132 to cause the oil to pass upward in the pipe and flow past the valve 124 into the outlet pipe 122.

The quantity of oil in the lubricating system is such that it never will fill the container 100 but at its maximum will be at about the level of the screen 140 so that the lower part 156 of the receptacle 100 will be full of oil while the upper part 154 will contain air at superatmospheric pressure.

A drain plug 158 is provided in order to enable the cleaning of the receptacle 100.

The screen 140 has mounted thereon a cylinder 160 which is open at its bottom. In the cylinder there is positioned the float 162 having a rod 164 attached thereto. This rod extends upwardly through an opening in the cored portion 165 of the fixture 102 as shown at 166 in Figure 8 and ends in a ball 170. The ball preferably is colored so that it is readily visible through the graduated gage glass 172 held in the bracket 174 which is open at one side and which is screw-threaded as at 176 and fastened into the distributor connector 178. This connector 178 has its lower end screw-threaded and connected as indicated at 179 to the fixture 102. Inasmuch as all parts of the float system are subject to the pressure which is maintained in the container 100, the parts just described will indicate the level of the oil in the container. When the level of the oil is at a maximum the ball 170 will be in the position shown in Figure 8 and for less quantities of oil the ball 170 will be in a position lower than that shown, depending upon the quantity of oil.

Referring to Figure 7, the distributor fixture 178 has screw-threaded thereinto the fitting 180 which is hollow. In the hollow of the fitting there is mounted a slidable piston 182 which is held against its seat 184 by means of a spring 186 the tension of which is regulated by a nut 188 screwed into the end of the hollow part of the fitting. The nut 188 is hollow to allow the spring to enter thereinto and is locked in place by means of the lock nut 190.

The fitting 180 has two outlet passages 192 and 194. Assuming that the passage 194 is closed, the pressure in the container 100 will increase until it is sufficient to overcome the tension of the spring 186 and will push the piston to a position where it opens the outlet 192 to allow the escape of air. The spring 186 preferably is so loaded that it will take about forty pounds of air pressure to force the piston 182 to open the outlet 192.

To the second outlet 194 suitable fittings 196 connect an outlet pipe 198 which leads to any suitable auxiliary devices such as a vacuum fan 199 to blow warm air to defrost the windshield, or a windshield wiper shown at 200 (Figure 1). The specific type of motor 202, fan 199, or windshield wiper 200 is immaterial and forms no part of the invention. Instead of to the windshield wiper 200 the pipe 198 may lead to an air spring, a gasoline pump, or any other suitable device on the vehicle which it is desired to inflate or to operate by air pressure. The windshield wiper 200 and fan 199 have been shown as illustrative.

The conduit or pipe 122 leads to a flow control 204 mounted on the engine at the position shown in Figure 1. The flow control is shown in detail in Figures 9 and 10 and comprises the upright hollow cylindrical part 206 and the arms 208 and 210. The oil from the pipe or conduit 122 is delivered through the hollow connection 211 into the interior of the hollow fitting 212, screw-threaded as at 214 into the end of the cylindrical part 206 of the flow control. The fitting 212 has the ports 216 and the cylindrical valve seat 218 therein. In the valve seat 218 there slides the valve 220 comprising the hollow stem 221 and the head 222 having the series of ports or openings 224. The ports or openings 224 are at different levels and are of increasing size as they are closer to the bottom of the valve. There are two series of ports 224 spaced 180° to give balance to the valve 220. The openings 224 are for the purpose of allowing the oil to pass through the valve and to enter the cylinder 206 as will be later described. A small port or bleed opening 225 is provided in the top center of the valve always to assure that some oil will pass through the valve. The stem 221 is provided with a plurality of openings 227 to allow oil to pass between the exterior and interior of the stem. The head 222 of the valve is made to fit and slide inside the cylindrical valve seat 218 and is provided at the base of the stem 221 with a shoulder 226 on which there rests the end of the coil spring 228 the other end abutting against a shoulder 230 formed on a sleeve 232 which slides in the cylinder 206 of the flow control. The shoulder 230 is formed by making a ring groove 234 in the sleeve 232, the groove being for the purpose of receiving a pin 236 of a lever 238 secured to the shaft 28, interconnected with the throttle. When the engine is not running the parts are in the position shown in Figure 9 with the end of the stem against the shoulder 230. Between the end of the cylindrical part 206 and the upper shoulder 240 on the sleeve 232 a second spring 242 is provided.

Figure 10:
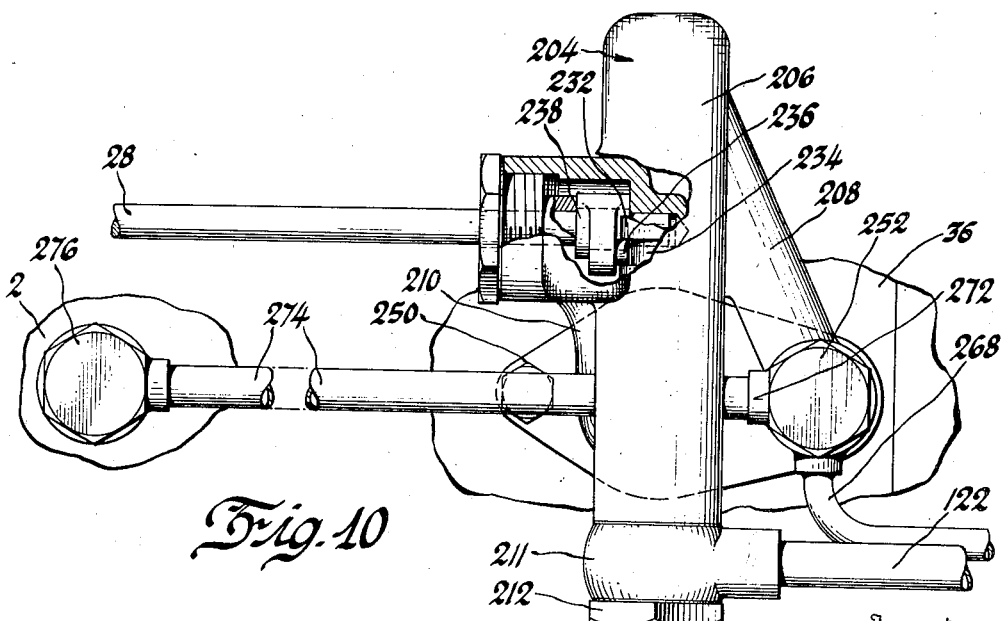
Figure 10 is a view of the flow control taken at right angles to Figure 9 looking from the left, with parts broken away and shown in section better to illustrate the construction.

At the top of the flow control 204 an outlet or mouth 244 delivers the oil into the passage 246 in the arm 206 of the flow control. The passage 246 delivers the oil to a hollow cylindrical distributor part 248 formed on the flow control 204. The flow control is secured to the engine block by means of the bolt 250 and the hollow bolt 252. The bolt 252 passes into the distributor 248 and is screw-threaded as at 254 into the engine block 36. The distributor has an interior diameter greater than the diameter of the bolt as is best shown in Figure 9 and when the oil enters the distributor a part of it passes through the openings 256 into the bore 258 and from the bore 258 into the passage 260 in the crankcase to be delivered through the opening 262 in the bearing shell 63 to the bearing part 66 of the crankshaft 64.

The wrist pins of the pistons are lubricated in the conventional way, that is, a passage 264 (Figure 9) is drilled in the crankshaft and passes through the throw 265 (Figure 3) of the shaft to the crankpin or connecting rod bearing. The pistons are connected to the usual connecting rods and the connecting rod bearings have bearing sleeves which surround the crankpins and receive their lubrication from the oil which passes through the passage 264. The connecting rods are drilled in the conventional way and carry the oil to the wrist pins. All of the oil delivered to the crankshaft and wrist pins will drain to the crankcase and fall to the bottom 74 to return to the sump.

Referring again to Figure 9, the hollow bolt 252 which secures the distributor in place also secures to the distributor 248 a hollow fixture 266 which has a pipe 268 connected thereto. This pipe 268 is best shown in Figure 1 and delivers the oil to the transmission 44 at the point indicated at 270.

The fixture 266 has the second outlet (Figure 10) to which there is connected a pipe 274 which delivers into a hollow bolt 276 similar to the bolt 252. The oil delivered to the hollow bolt 276 passes into a passage in the outer rib of the crankcase (the passage being similar to the passage 260 in Figure 9) to lubricate the second bearing of the crankshaft.

The oil delivered to the transmission 44 from the pipe 268 will lubricate the gears and bearings of the transmission. The oil will reach the level of the bottom of the lower opening 277 and then flow through the screen 278 secured over the opening. The oil will spill over the gears 52 and 54 and flow to the sump.

The oil filler is shown as a whole at 278 in Figure 1 and is shown in detail in Figure 4. The oil filler has the usual removable cap 280 to allow access to the filler pipe 282. A cylinder 284 surrounds the mouth of the pipe 282 and is spaced therefrom at its bottom by the ring 286 and at the top by the funnel-shaped element 288. The ring 286 is provided with a plurality of openings 290 and the funnel has a plurality of openings 292. In the space between the elements 286 and 288 and between the cylinder 284 and the filler pipe 282 an air cleaning material 294 is applied. This air cleaning material may be of any suitable type but is preferably a brass-copper gauze saturated with a grease or an oil and catches the dirt particles as the air enters the openings 292 to pass into the housing 60 and through the openings 296 (Figure 1) into the transmission housing 44 and then to the sump 50.

The operation of the lubricating system is as follows: Assuming that the engine is started and that the crankshaft 64 and flywheel 60 are rotating, the gear 62 will also be set in motion. This will drive the idler 76 which in turn will drive the oil pump 84. The oil pump will draw the oil from the sump 50 through the pipe 94 and deliver the oil and air sucked from the sump into the pipe 98, to be transferred to the receptacle 100 which is fluid tight and will allow neither the escape of the air nor the oil. The delivery of air and oil from the pipe 98 will create pressure in the inlet 106 (Figure 5) and will push the inlet valve 108 from its seat to cause the oil and air to enter the receptacle. Simultaneously, the pressure in the inlet 106 will actuate the piston 144 to cause the stem 146 to push the outlet valve 124 from its seat to cause the air pressure formed in the chamber 154 to act on the surface of the oil to force it into the end 132 of the pipe 130 and cause it to be delivered past the open valve 124 and into the outlet pipe 122. From the pipe 122 the lubricant will be delivered to the flow control 204 through the connection 211. The oil will be forced through the passages 216 and 225 to the passage 246. To cause the engine to run the throttle valve will have been opened a little which will cause the movement of the shaft 28 and its lever 238 to cause the upward movement of the sleeve 232 and the separation of the shoulder 230 from the end of the stem 221 and a decrease of compression of the spring 228. The pressure of the oil will now be able to force the valve 220 upward and away from its seat 218 against the compression of the spring 228 successively to bring into operation the holes 224 of the two series of ports in the valve head 222 to supply an increased quantity of oil the more the throttle is opened. When the oil passes the opening in the valve 220 it will flow through the openings 227 in the stem 221, up through the stem and sleeve 232 to the mouth 244 of the passage 246 to be delivered to the distributor 248. From the distributor 248 part of the oil will flow into the passage 260 of Figure 9, another part will flow into the pipe or conduit 268 to the transmission, and a third part will flow into the pipe 274 to be delivered to the hollow bolt 276 to lubricate the second bearing of the crankshaft. From all three of these distributing points the oil will redrain to the sump 50 to be retaken by the pump and reforced to the receptacle.

By referring to Figures 1 and 9 it will be noted that the throttle valve in the chamber 10, through the linkage 22 and 26, is directly interconnected with the flow control 204 by means of the shaft 28. In the position of the parts shown in Figure 9 the throttle is in closed position. When the operator accelerates the vehicle to open the throttle, the shaft 28 will be turned so that the lever arm 238 (Figure 9) will be moved upward, to move the sleeve 232 upward, to cause a less compression of the spring 228 to be exerted against the valve 220. The valve 220 will now offer much less resistance to the flow of oil so that the pressure in the tank 100 is able to force a greater quantity of oil past the valve and into the distributor 246 so as the engine accelerates there will be an increased quantity of oil supplied to the bearing parts. In other words, the quantity of oil supplied to the working parts of the engine, transmission and differential is proportional to engine speed or proportional to the position of the throttle. The farther open the operator places the throttle the more oil will be delivered.

When the operator wishes to operate the windshield wiper or the vacuum fan he will operate a conventional valve on the windshield motor 202 or on the fan motor to allow the air in the passage 198 to act on the motors to operate the auxiliary devices.

I claim:

1. In a flow control unit for the lubricating system of internal combustion engines having a throttle and an operating means therefor, said unit comprising a hollow barrel-like part having an inlet, a valve controlling the flow of oil through the inlet, a sleeve slidable in the barrel, a spring in the barrel and having one end retained by the sleeve, said spring resting on the valve and constantly urging it to closed position, a lever connected to the sleeve to move the same, and means interconnected with the throttle operating means to operate the lever to move the sleeve to decrease the pressure of the spring on the valve for throttle-open positions, whereby the amount of oil passing the valve will be proportional to the position of the throttle.

2. In a pressure lubricating system, a pump, a fluid tight container adapted to receive lubricant and air from the pump and maintain the lubricant under pressure, a fitting attached to the container, an air and lubricant inlet passage in said fitting, a valve in the passage to allow entrance but prevent exit of lubricant, a lubricant outlet passage in the fitting, a valve in the outlet, a screen extending across substantially the middle of the container and through which the lubricant must pass, a pipe in the container extending from the outlet through the screen and to the bottom of the container, and a screen around the bottom of the pipe.

3. In a pressure lubricating system for an internal combustion engine having a transmission associated therewith, a common sump for the oil draining from the engine and transmission, a pump driven by the engine to draw oil and air from the sump, a conduit connected to the pump to receive the oil and air pumped thereby, a fluid tight container adapted to receive the air and lubricant from the conduit, an inlet passage to the container and connected to the conduit, a valve in the passage to allow the entrance and prevent the exit of lubricant, an outlet passage from the container, a valve in the outlet passage opening in the same direction as the valve in the inlet, means operated by the pressure in the system to open the outlet valve to enable the lubricant to leave the container, an outlet pipe leading from the bottom of the conduit to the outlet valve, and a conduit from the other side of the valve leading to the parts of the engine and transmission to be lubricated, the lubricant being forced through the outlet valve by the pressure in the container.

4. In a pressure lubricating system for an internal combustion engine having a transmission associated therewith, a common sump for the oil draining from the engine and transmission, a pump driven by the engine to draw oil and air from the sump, a conduit connected to the pump to receive the oil and air pumped thereby, a fluid tight container adapted to receive the lubricant from the conduit, an inlet passage to the container and connected to the conduit, a valve in the passage to allow the entrance and prevent the exit of lubricant, an outlet passage from the container, a valve in the outlet passage opening in the same direction as the valve in the inlet, a piston between the inlet and outlet passages, a stem on said piston contacting with the outlet valve, the pressure in the system moving the piston to cause the stem to open the outlet valve to enable the lubricant to leave the receptacle, an outlet pipe leading from the bottom of the conduit to the outlet valve, and a conduit from the other side of the valve leading to the parts of the engine and transmission to be lubricated, the lubricant being forced through the outlet valve by the pressure in the container.

5. In a pressure lubricating system for an internal combustion engine having a transmission associated therewith, a common sump for the oil draining from the engine and transmission, a pump driven by the engine to draw oil and air from the sump, a conduit connected to the pump to receive the oil and air pumped thereby, a fluid tight container adapted to receive the lubricant from the conduit, an inlet passage to the container and connected to the conduit, a valve in the passage to allow the entrance and prevent the exit of lubricant, an outlet passage from the container, a valve in the outlet passage opening in the same direction as the valve in the inlet, means operated by the pressure in the system to open the outlet valve, a pressure relief valve at the container, an outlet pipe leading from the bottom of the conduit to the outlet valve, and a conduit from the other side of the valve leading to the parts of the engine and transmission to be lubricated, the lubricant being forced through the outlet valve by the pressure in the container.

ERIC OLLE SCHJOLIN.